(12) United States Patent
Kitagawa

(10) Patent No.: US 6,304,283 B1
(45) Date of Patent: *Oct. 16, 2001

(54) CONFERENCE APPARATUS AND METHOD FOR REALISTICALLY REPRODUCING IMAGE DATA AND SHARED BOARD DATA

(75) Inventor: Eiichiro Kitagawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/592,569

(22) Filed: Jan. 26, 1996

(30) Foreign Application Priority Data

Jan. 31, 1995 (JP) .................................. 7-034254

(51) Int. Cl.[7] ..................................... H04N 7/14
(52) U.S. Cl. .................. 348/14.06; 348/14.08; 345/331
(58) Field of Search ............ 348/14–17; 345/329–332, 345/473, 203, 213, 302; 395/200.34; 379/93.01, 93.21, 93.17; 358/400, 405; 709/204

(56) References Cited

U.S. PATENT DOCUMENTS

| | | | |
|---|---|---|---|
| 5,227,893 | * 7/1993 | Ett ........................................ | 358/400 |
| 5,351,276 | * 9/1994 | Doll, Jr. et al. .................. | 379/93.01 |
| 5,559,875 | * 9/1996 | Bieselin et al. ..................... | 379/202 |
| 5,583,980 | * 12/1996 | Anderson ............................. | 345/473 |
| 5,689,641 | * 11/1997 | Ludwig et al. ........................ | 348/16 |
| 5,799,191 | * 8/1998 | Moriyasu et al. .................... | 345/331 |
| 5,818,436 | * 10/1998 | Imai et al. ............................ | 345/302 |
| 5,995,096 | * 11/1999 | Litahara et al. ..................... | 345/330 |
| 6,157,463 | 12/2000 | Kitagawa ............................ | 358/400 |

* cited by examiner

*Primary Examiner*—Curtis Kuntz
*Assistant Examiner*—George Eng
(74) *Attorney, Agent, or Firm*—Fitzpatrick, Cella, Harper & Scinto

(57) ABSTRACT

A conference apparatus is adapted to advantageously perform a conference with a remote counterpart apparatus, store information on the events of the conference and then provide a realistic reproduction of those events. To this end, the conference apparatus includes an image memory for storing image information entered during the conference. A shared board presents the same image frame to the conference apparatus and to the counterpart apparatus, where the shared board is adapted to have shared information written therein by both the conference apparatus and by the counterpart apparatus, and a shared information memory, different from the image memory time-sequentially stores the shared information written into the shared board. To reproduce the conference in response to time information indicating a time corresponding to a portion of the stored shared information, the conference apparatus reproduces the stored shared information time-sequentially at a high speed until reaching the portion and thereafter synchronously reproduces both the stored image information and the stored shared information time-sequentially at a lower, substantially real-time speed to provide a realistic reproduction of events at the conference.

18 Claims, 10 Drawing Sheets

FIG. 3

| TAG | DATA |
|---|---|
| 01 (INPUT TYPE) | 01 (CHARACTER), 02 (STRAIGHT LINE), 03 (CIRCLE), 04 (RECTANGLE) |
| 02 (START POINT) (UPPER LEFT CORNER POINT) | (X, Y) |
| 03 (END POINT) (LOWER RIGHT CORNER POINT) | (X, Y) |
| 04 (ORIENTATION) | 0° – 360° |
| 05 (CHARACTER TYPE) | 01 (GOTHIC), 02 (MING DYNASTY STYLE), 03 (WRITING BRUSH STYLE) |
| 06 (CHARACTER SIZE) | (POINT NUMBER) |
| 07 (LINE TYPE) | 01 (SOLID LINE), 02 (BROKEN LINE), 03 (CHAIN LINE), 04 (WAVE LINE), (DOUBLE LINE) |
| 08 (LINE THICKNESS) | (mm) |
| 09 (RADIUS) | (r) |
| 10 (CENTER) | (X, Y) |
| ... | |
| 20 (INPUT CHARACTER STRING) | " ABCDEFG " |

FIG. 5

| TIME | INPUT TYPE | START POINT | END POINT | ORIENTATION | CHARACTER TYPE, LINE TYPE | INPUT CHARACTER STRING |
|---|---|---|---|---|---|---|
| 00:10:05 — 00:25:03 | 01 (CHARACTER) | 20, 20 | | 0 (RIGHT LATERAL) | 0124 (GOTHIC, 24 POINTS) | SUBJECT HOW TO GO ON WITH TV CONFERENCE |
| 00:32:23 — 00:36:42 | 02 (STRAIGHT LINE) | 25, 20 | 25, 200 | 0 (RIGHT LATERAL) | 01.6 (SOLID LINE, 0.6mm) | |
| | | | | | | |

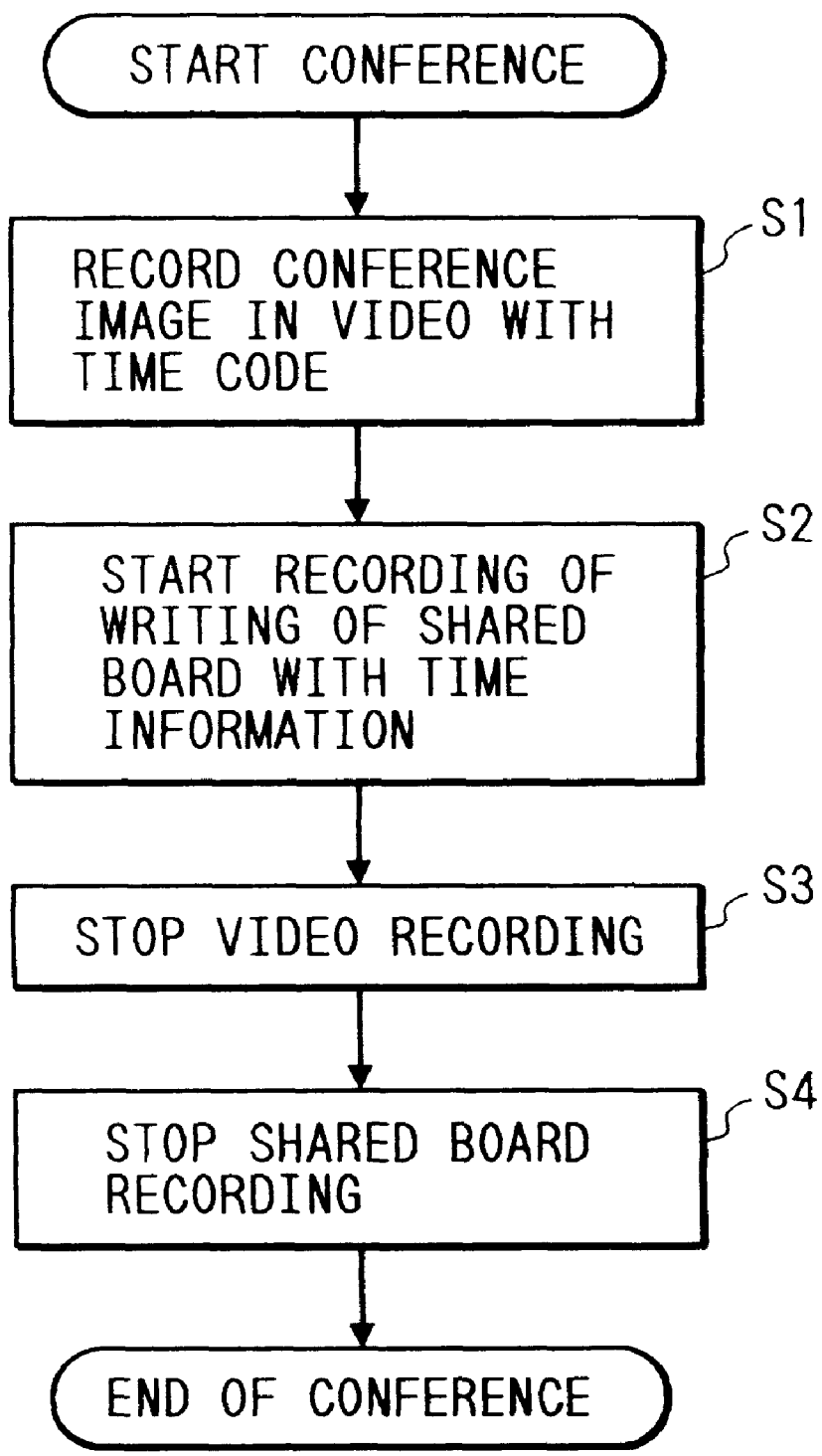

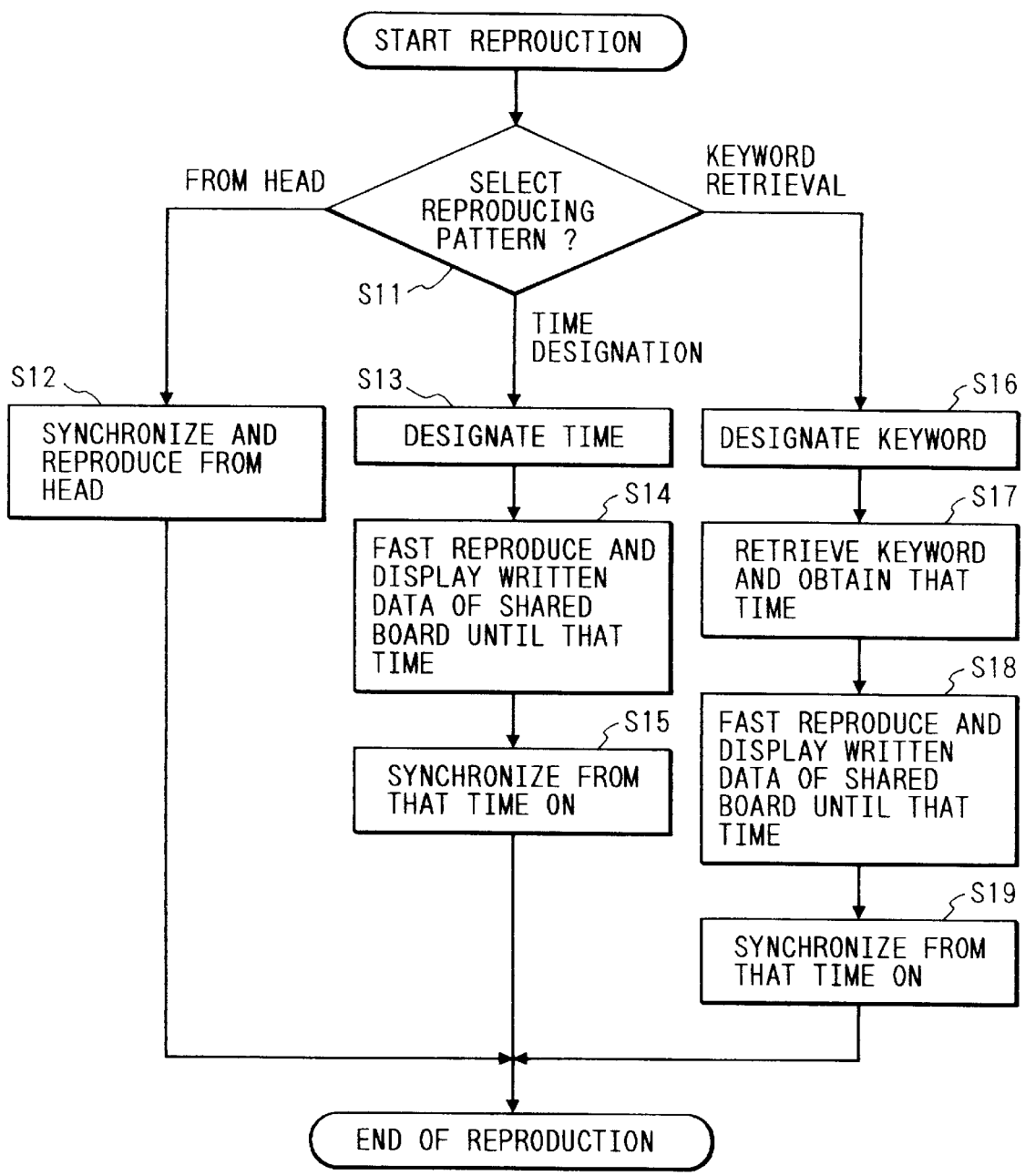

FIG. 8

| TIME | INPUT EVENT | | | | |
|---|---|---|---|---|---|
| | KEYBOARD INPUT | INPUT STATUS | MOUSE BUTTON CLICK | | MOUSE POINTER MOVE |
| | | | RIGHT BUTTON | LEFT BUTTON | |
| 00:10:05 | | NORMAL INPUT | | | |
| 00:13:04 | | NORMAL INPUT | | | (20, 20) |
| 00:18:23 | ROMAN LETTERS INPUT KEY | ROMAN LETTERS INPUT | | | |
| 00:22:05 | g | ROMAN LETTERS INPUT | | | |
| 00:23:32 | i | ROMAN LETTERS INPUT | | | |
| 00:24:03 | d | ROMAN LETTERS INPUT | | CLICK | |
| 00:25:23 | a | ROMAN LETTERS INPUT | | | |
| 00:26:04 | i | ROMAN LETTERS INPUT | | | |
| 00:27:53 | CONVERSION KEY | ROMAN LETTERS INPUT | | | |
| 00:28:32 | CONVERSION DETERMINATION KEY | ROMAN LETTERS INPUT | | | |
| ... | | | | | |

CONFERENCE APPARATUS AND METHOD FOR REALISTICALLY REPRODUCING IMAGE DATA AND SHARED BOARD DATA

BACKGROUND OF THE INVENTION

1. Field of the Invention

The present invention relates to a conference apparatus and a conference system, and more particularly to a conference apparatus and a conference system having a shared board function and an image recording function.

2. Related Background Art

For recording the proceedings of a video conference, there have been utilized the methods of (1) video recording the image and voice of a monitor, (2) storing or printing the information written on a shared board, by an operation of the user, and (3) video recording the image and voice of the counterpart of the conference.

However, the recorded result obtained in such conventional recording methods has only limited value for re-utilization. More specifically, in method (1), in which the content of the conference is stored in the form of video information, it is difficult to utilize the proceedings of the conference for example in a computer by extracting the written information on the board and storing it in a file.

In method (2), in reviewing afterwards the stored written information on the shared board, it is difficult to trace the proceeding of the conference and the discussion at the conference, such as the explanation on the written information, cannot be obtained.

In method (3), it is impossible to exactly comprehend the proceeding of the conference from the reproduced video information, as the written information on the shared board is not available.

Also these methods, even if used in combination, are still inconvenient because the different recording means are not mutually linked. For example, in the combination of methods (2) and (3), it is still difficult to comprehend the proceedings of the conference by reviewing the video information in combination with the written information on the board, because the correlation thereof in time is not available and has to be supplemented by human memory.

SUMMARY OF THE INVENTION

In consideration of the foregoing, an object of the present invention is to enable recording and reproduction of the proceeding of a conference in a form with improved reutilizability.

Another object of the present invention is to provide a conference apparatus and a conference system capable of storing both the data of a shared board and the input image.

Still another object of the present invention is to store the data of a shared board and the input image separately, with mutual correlation in time, thereby improving the value of reutilization of such data and input image at the reproduction thereof.

The foregoing objects can be attained, according to a preferred embodiment of the present invention, by a conference apparatus comprising image memory means for storing image information entered in a conference, in correlation with time information, a shared board having the same image in the present apparatus and in a conference apparatus constituting the counterpart of the conference and adapted to be written in from the present apparatus and from the counterpart apparatus, and shared information memory means for storing the writing information on the shared board in correlation with time information.

Still another object of the present invention is to improve the operability in the reproduction of the data of the shared board and the input image, stored separately.

Still another object of the present invention is to provide a conference apparatus and a conference system with novel functions.

Still other objects of the present invention, and the features thereof, will become fully apparent from the following detailed description, which is to be taken in conjunction with the attached drawings.

BRIEF DESCRIPTION OF THE DRAWINGS

FIG. 3 is a view showing an example of the tag and the data represented by the tag;

FIG. 5 is a view showing stored data corresponding to the written information in FIG. 4;

FIG. 6 is a flow chart showing a recording process for the content of the conference;

FIG. 7 is a flow chart showing a reproducing process for the content of the conference;

FIG. 8 is a view showing an example of the stored data in case the written information on the shared board is stored in an input event format;

DETAILED DESCRIPTION OF THE PREFERRED EMBODIMENTS

Now the present invention will be clarified by an embodiment thereof with reference to the attached drawings.

Figure 1:
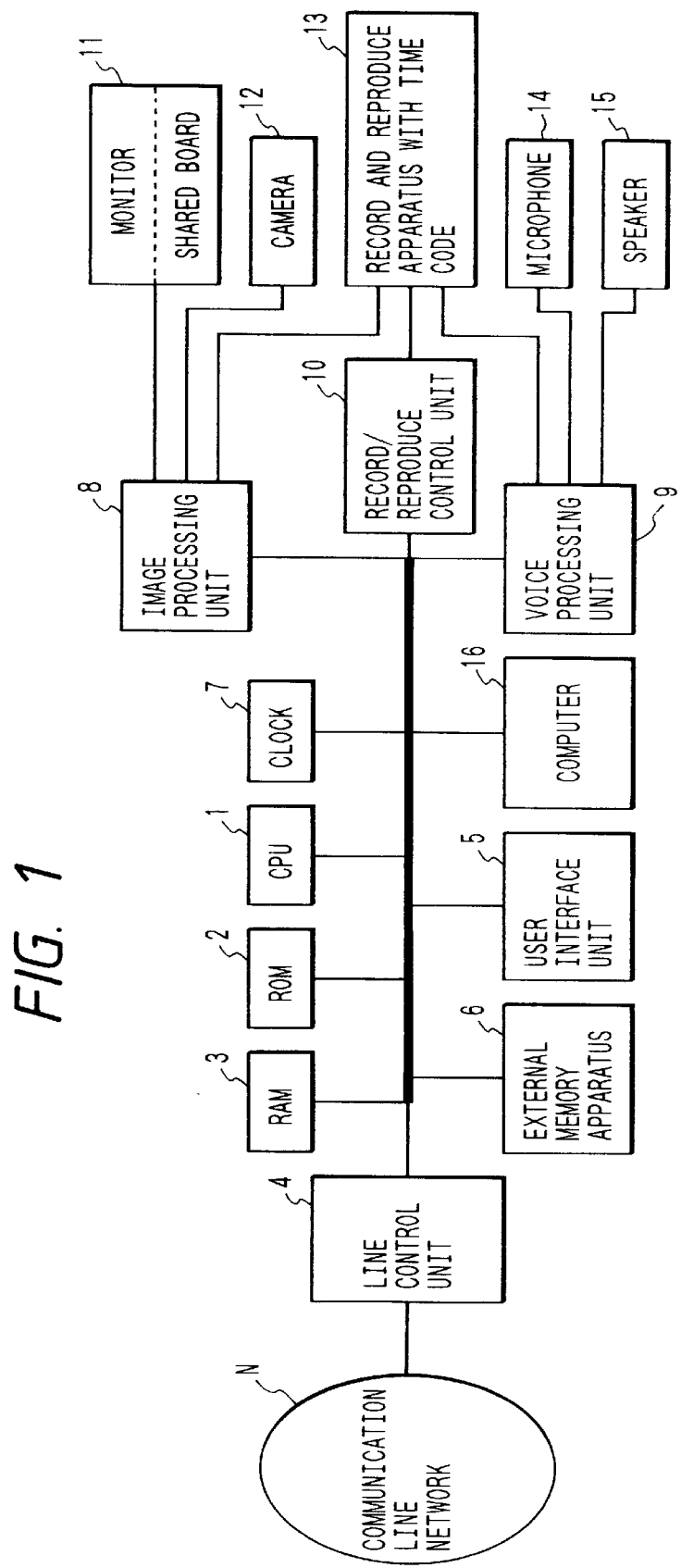
FIG. 1 is a schematic block diagram of a video conference apparatus constituting an embodiment of the present invention.

FIG. 1 is a schematic block diagram of a conference apparatus constituting an embodiment of the present invention.

In FIG. 1, there are shown a CPU 1 for controlling the entire apparatus; a ROM 2 storing an operating system, etc. therein; a RAM 3 to be used as a work area in various controls of the CPU 1 and to store a program loaded from an external memory device 6; a line control unit 4 for transmission and reception of image and voice data through a communication network N; a user interface unit 5 connected to an unrepresented keyboard and an unrepresented pointing device such as a mouse; an external memory device 6 for storing a program corresponding to a record/reproducing function to be explained later and for storing written information on a shared board to be explained later; and a clock 7 to be utilized for recording and storing the written information on the shared board in combination with time information (data).

There are also shown an image process unit 8 for effecting various processes on the received image data of the counterpart (image data of the counterpart of the conference entered by a camera of the counterpart apparatus) and the image data taken by a camera 12 of the present apparatus; a voice process unit 9 for effecting various processes, such as the output of the received voice data of the counterpart and the voice data of the present apparatus entered from a microphone 14 thereof, through a loudspeaker 15; and a record control unit 10 for recording the image data of the counterpart and the voice data of the counterpart and the apparatus together with time information (time codes), in a device 13 for record/reproducing with time code.

A monitor 11 displays the image of the counterpart and the shared board in the window format under the control of the CPU 1 and the image process unit 8. The information written on the shared board is also stored in the external memory device 6, together with the time information. A computer 16, controlled by instructions from a user interface 5, effects editing of the data in the shared board and data storage in a detachable disk.

Figure 9:
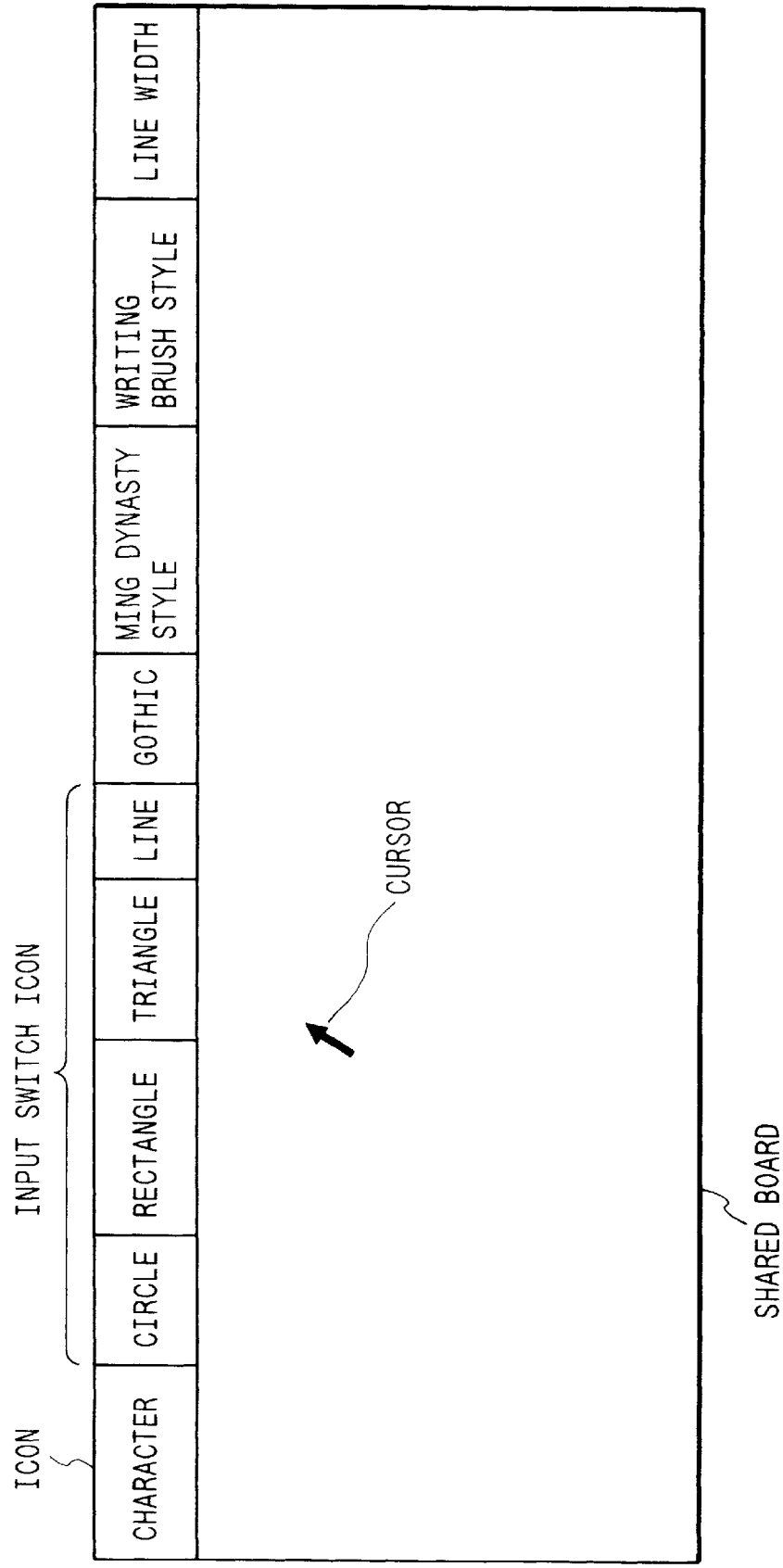
FIG. 9 is a view showing the shared board in the present embodiment.

An example of the shared board of the present embodiment is shown in FIG. 9. The shared board has a same image frame in the present apparatus and in the counterpart apparatus, and is used for writing a text (characters) or drawing a graphic pattern such as a straight line or a circle, from the user interface unit 5. It is also capable of changing the color or the shape of the data written by the present apparatus and by the counterpart apparatus, thereby enabling the users to identify which apparatus is used for data writing.

Figure 2:
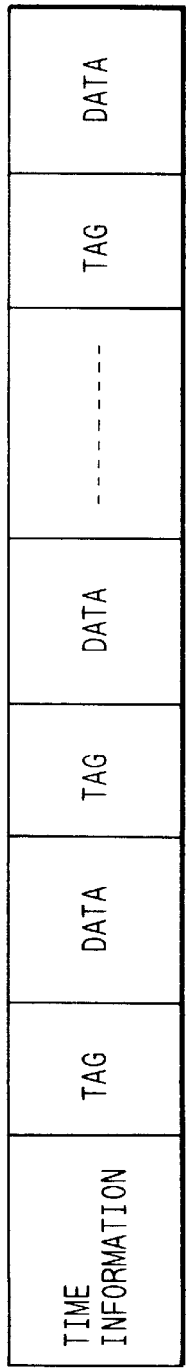
FIG. 2 is a view showing the data structure in the storage of the written information on the shared white board WB.

The information written into the shared board is stored in the external memory device 6, as shown in FIG. 2, by leading time data (time code) and ensuing paired structures, each comprising a tag and data. The tag indicates the kind of data, and the data of the kind indicated by the tag follows the tag.

FIG. 3 shows examples of the tag and the kind of tag indicated by the tag. Data corresponding to a tag indicating the kind of input (tag code "01") include a character (01), a straight line (02), a circle (03) and a rectangle (04). Tag codes "02", "03", "04", "06", "08", "09" and "20" respectively indicate the start point, end point, direction, character size, line thickness, radius, and character train. Data corresponding to a tag code "05" indicating character font include gothic style (01), Ming style (02) and writing brush style (03). Data corresponding to a tag code "07" include a solid line (01), a broken line (02) a chain line (03), a waving line (04) and double lines (05). The information of a character written on the shared board is stored, for example, by codes "01", "02", "03", "04", "05", "06", "20", etc. and the information of a straight line is stored, for example, by codes "01", "02", "03", "04", "07", "08", etc.

Figure 4:
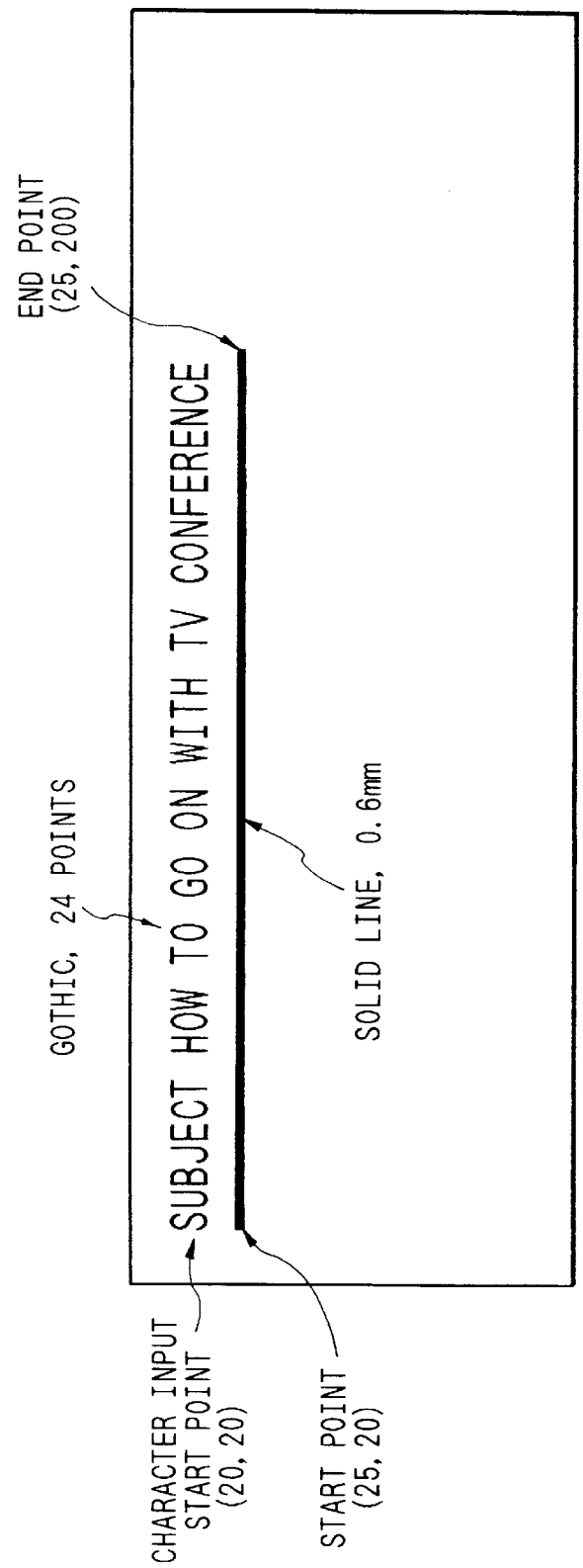
FIG. 4 is a view showing an example of the information written on the shared board WB.

As an example, in the case a character train and a line as shown in FIG. 4 are written on the shared board, the data are stored in a form as shown in FIG. 5. More specifically, for the character train, there are stored the data of the first row in FIG. 5, corresponding to a time 00:10:05–00:25:03, and for the solid line written afterwards, there are stored the data of the second row. In this manner, the information written on the shared board is stored in the form of data items representing the written content, in correlation with the time information.

The storage in the external memory device 6 is executed, in the case of character input, at the line feed after the character input. The time information indicates a period, after the selection of a character icon shown in FIG. 9, from the start of character input to the input of the line feed.

The input of a line or a pattern is executed by the designation of an input switching icon, shown in FIG. 9, with a mouse or a cursor for selecting a line or a pattern (circle, rectangle, triangle, etc.), and the designation of a start point and an end point in the case of a line, or a center and a radius in case of a circle, or two diagonal corner points in the case of a rectangle, or three points in the case of a triangle, by means of the mouse.

The storage into the external memory device 6 is executed at the input of each pattern.

In the following there will be explained, with reference to a flow chart in FIG. 6, the recording process for the proceedings of the conference.

When the conference is started, the start of video recording is instructed by the user through the user interface unit 5. According to a program loaded from the external memory device 6 to the RAM 3, the CPU 1 receives, through the line control unit 4, the data of the counterpart apparatus transmitted through the communication network N, and causes the image process unit 8 and the voice process unit 9 to process the received data, thereby extracting the image data and the voice data of the counterpart apparatus. The CPU 1 also causes the voice process unit 9 to mix thus extracted counterpart voice data with the voice data of the present apparatus entered from the microphone, and causes the video control unit 10 to record, in the time-coded record/reproducing unit 13, the counterpart image data and the mixed voice data, together with a time code, indicating the time, obtained from the clock 7 (step S1).

Also, when the storage of the shared board is instructed by the user through the user interface unit 5, the CPU 1 records the written data of the shared board in the external memory device 6, together with time data obtained from the clock 7 (step S2). When the termination of the video recording is instructed by the user through the user interface unit 5, the CPU 1 causes the video control unit 10 to terminate the video recording (step S3). Also when the termination of the recording of the shared board is instructed by the user through the user interface unit 5, it terminates the recording operation of the written information of the shared board (step S4). Such an accumulation of the written information of the shared board, separate from the image and voice data, enables the user to read and process the data of the shared board only, by the computer 16 under the control of the CPU 1.

In the following, there will be explained the reproducing process of the proceedings of the video conference, with reference to a flow chart shown in FIG. 7.

Figure 10:
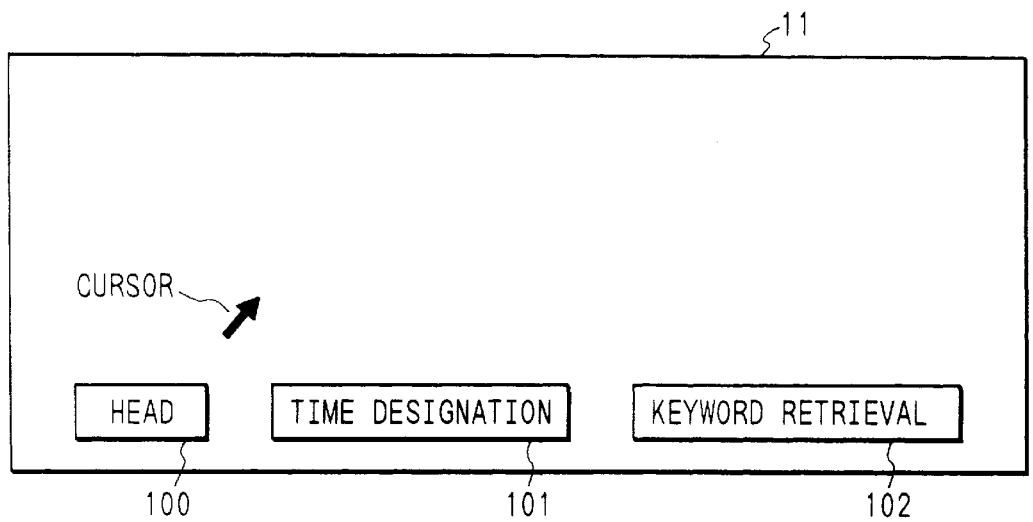
FIG. 10 is a view showing an initial image frame in the reproducing operation of the present embodiment.
Figure 11:
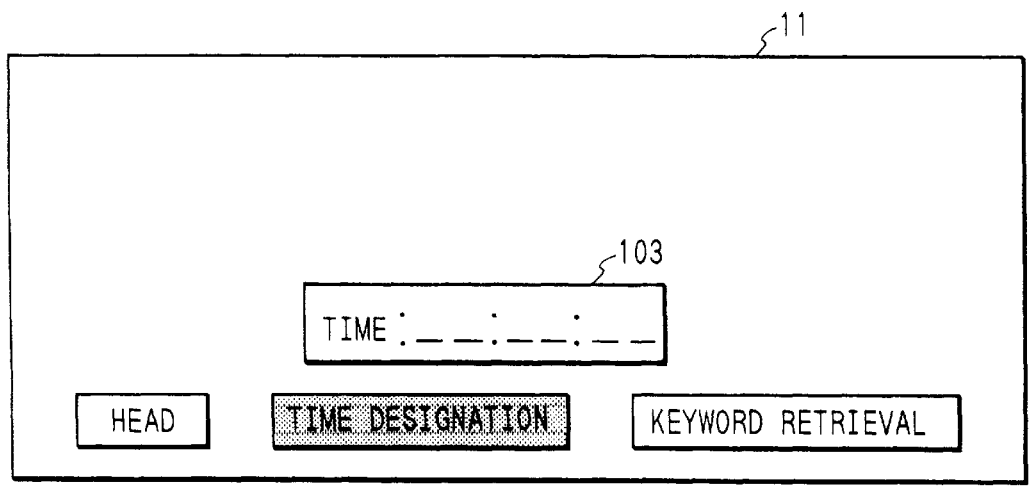
FIG. 11 is a view showing an image frame, in case the reproduction is made with designation of a time in the present embodiment.

When the reproduction of the proceedings of the video conference is instructed through the user interface unit 5, the monitor 11 provides a display shown in FIG. 10. Then, the CPU 1 identifies the selecting information on the pattern to be reproduced, instructed by the mouse of the user interface unit 5 (step S11).

If an icon 100 is clicked to enter selecting information indicating that the reproduction is to be made from the start of the conference, the CPU 1 causes the video control unit 10 to rewind the video tape of the time-coded record/reproducing unit 13 thereby reading the counterpart image data and the mixed voice data (video-recorded data) from the start of recording of the video conference. At the same time, it reads, from the external memory device 6, the written data of the shared board of the conference, and causes the image process unit 8 to display the counterpart image data and the written data of the shared board on the monitor 11 in a multi-window format.

It is not essential, however, to use a single monitor in common for the counterpart image data and the written data of the shared board, and there may be provided separate monitors for these data.

Also, the mixed voice data are reproduced and released from the loudspeaker 15 through the voice process unit 9.

In this operation, the counterpart image data and the written data on the shared board are reproduced, on the monitor 11, in mutual synchronization, based on the time data (time codes) of both data. Also, the mixed voice data are reproduced in synchronization, based on the time data, with the written data on the shared board. Thus, the counterpart image data, the written data on the shared board and the mixed voice data are reproduced in mutual synchronization based on the time data. The reproduced display of the written data on the shared board is executed according to an application program for the shared board reproduction, loaded in the RAM 3.

If the step S11 identifies the selection of an icon 101, selecting a time-designated reproduction, a window 103 is displayed by the CPU 1 and the user enters the time of desired reproduction from the keyboard (step S13). Thus, the CPU 1 displays, according to the program in the RAM 3, the written data of the shared board in a high-speed reproduction to the designated time (step S14). The written data thereafter of the shared board are reproduced in synchronization with the video-recorded data, based on the time data (step S15).

If the step S11 identifies the selection of an icon 102, selecting keyword search, a keyword is entered (step S16). Under the control by the program in the RAM 3, the CPU 1 searches the designated keyword in the written data of the shared board stored in the external memory device 6, and obtains the time data indicating the time of writing of the data on the board (step S17).

Figure 12:
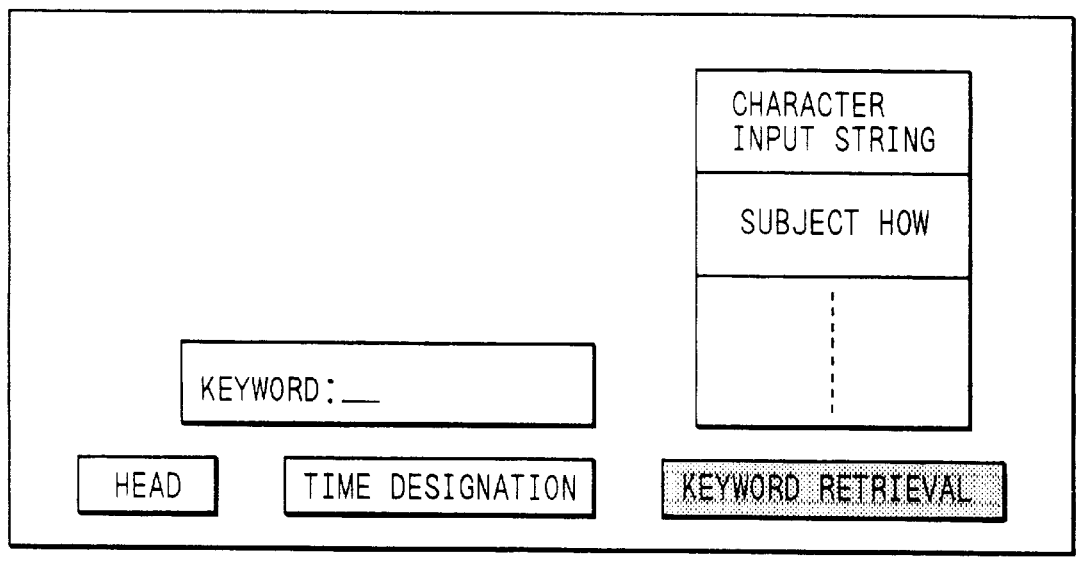
FIG. 12 is a view showing an image frame in case the reproduction is made with designation of a keyword in the present embodiment.

Then, the written data on the shared board are reproduced at a high speed, until the write-in time of the data (step S18). The subsequent written data on the shared board are reproduced, together with and in synchronization with the video-recorded data, based on the time data (step S19). The designation of the keyword is executed by displaying a list of the entered character trains, stored in the external memory device 6, on the monitor as shown in FIG. 12 and by entering a desired character train, selected from the list, through the user interface.

If the external memory device 6 has a sufficiently large memory capacity, it is also possible to store, in addition to the data format shown in FIG. 5, full-frame data of the board at predetermined intervals (for example, 5 or 10 minutes), or at times designated by the user in the course of conference, for the purpose of retrieving after the conference, in the external memory device 6 together with the time data.

At the retrieval, the data of the shared board are time-sequentially displayed as the representative image frames, for example at intervals of 30 seconds. The user can select desired data of the shared board, by entering an instruction from the user interface, when a desired representative image frame is displayed. The CPU 1 effects high-speed reproduction of the data of the shared board shown in FIG. 5, based on the time data of the selected data of the shared board, and also effects rewinding and high-speed reproduction of the video-recorded data according to the time data, thereby reproducing the data of the shared board and the video-recorded data in synchronization on the monitor 11.

It is also possible to reduce the representative image frame to a ¼ size by the CPU 1, instead of the full-frame size, and to store it in the reduced size in the external memory device 6. In this case, a search image frame may be composed of four representative image frames, synthesized into an image frame by the CPU 1.

The user enters an instruction by the user interface 5 when a desired representative image frame is displayed, whereupon the CPU 1 again reads the four representative image frames from the external memory device 6 and displays them time-sequentially.

Thereafter, the data of the shared board are reproduced at a high speed to the time of the designated representative image frame as explained in the foregoing, and the data of the shared board and the corresponding video-recorded data are reproduced in synchronization.

The above-mentioned two memory formats of the data of the shared board can be suitably selected by the user through the user interface 5, prior to the start of the conference, according to whether the conference is going to be long and require a large number of representative image frames, or the conference is going to be short and require only a limited number of representative image frames.

As explained in the foregoing, the video-recorded data consisting of the counterpart image data and the mixed voice data are stored, together with the time data, in the time-coded record/reproducing unit 13, while the written data on the shared board are stored, together with the time data, in the external memory device 6, and such video-recorded data and written data of the shared board are reproduced in mutual synchronization, based on the time data.

Consequently, the proceedings of the video conference can be faithfully recorded and reproduced, and, at the reproduction, the proceedings of the video conference can be easily and exactly recognized. Also, the data of the shared board, being independently stored in the memory, provide improved reutilizability. The record/reproducing unit 13 is not limited to an analog recording system but can also be composed of a digital recording system, using semiconductor memory.

Also, the present embodiment employs the external memory device 6 and the time-coded record/reproducing unit 13 in a separate manner, but it is also possible to incorporate these devices 6, 13 at different addresses of the same digital memory medium, by employing a digital memory system for the time-coded record/reproducing device 13.

It is also possible to store the written data of the shared board, instead of the data of the character train, line, etc., by a form of input events corresponding to the input operations of the user. Such input events include, for example, keyboard operations, movement and clicking of the mouse, etc., and, at the generation of each input event, the kind and time thereof are stored in the external memory device 6 as shown in FIG. 8.

At the reproduction, these input events stored in the external memory device 6 may be processed by an application program for reproduction, showing the same reactions as at the input operations. Such an application program allows reproduction of the same content as as at the input, on the shared board, by reading and interpreting the input events from the external memory device 6.

In the present invention, as explained in the foregoing, the video information on the video conference is recorded together with the time information, while the written information on the shared board is also stored together with the time information, and thus the recorded video information and the stored written information of the shared board are reproduced in mutual synchronization, based on the recorded/stored time information, so that the proceedings of the video conference can be recorded and reproduced in a form with improved reutilizability.

What is claimed is:

1. A conference apparatus adapted to perform a conference with a remote counterpart apparatus, said conference apparatus comprising:

an image memory for storing image information entered during the conference;

a shared board presenting a same image frame to said conference apparatus and to the counterpart apparatus, wherein said shared board is adapted to have shared information written therein both by said conference apparatus and by the counterpart apparatus;

a shared information memory for storing drawing information as the drawing information is input in said shared board, without storing, simultaneously with that drawing information as it is input, previously-stored drawing information;

instruction means for instructing a timing, associated with the information from among the stored information of the conference, to reproduce the information associated with that timing, from among the stored information of the conference; and reproduction means for time-sequentially reproducing, at a faster-than-real-time rate, the shared information stored in said shared information memory, while displaying it at said faster-than-real-time rate, to reach a timing associated with that information, from among the stored information of the conference, instructed by said instruction means for instructing a timing, and reproducing the shared information in synchronism with the image information stored in said image memory, in real time.

2. An apparatus according to claim 1, further comprising input means for inputting information concerning a time.

3. An apparatus according to claim 1, wherein, on said shared board, a color or shape of information written by said conference apparatus is different from a color or shape of information written by the counterpart apparatus.

4. An apparatus according to claim 1, wherein the shared information includes a character and a figure.

5. An apparatus according to claim 1, wherein the shared information includes at least one of drawing position information, size information, thickness information, and drawing figure size information of the shared information on said shared board.

6. An apparatus according to claim 1, wherein the indication indicates a time.

7. An apparatus according to claim 1, wherein the indication indicates a keyword.

8. An apparatus according to claim 1, wherein the shared information is stored for each input event.

9. A method of controlling a conference apparatus to perform a conference with a remote counterpart apparatus, said method comprising the steps of:

storing image information entered during the conference in an image memory;

presenting a same image frame to the conference apparatus and to the counterpart apparatus on a shared board, wherein the shared board is adapted to have shared information written therein by both the conference apparatus and by the counterpart apparatus;

storing drawing information as the drawing information is input in the shared board, without storing, simultaneously with that drawing information, previously-stored drawing information;

instructing a timing, associated with that information, from among the stored information of the conference, to reproduce that information associated with that timing, from among the stored information of the conference; and reproducing the shared information at a faster-than-real-time rate, while displaying it at said faster-than-real-time rate, to reach a timing, associated with that information, from among the stored information of the conference, instructed in said instructing step, and reproducing the shared information in synchronism with the image information stored in the image memory, in real time.

10. A method according to claim 9, further comprising the step of inputting information concerning a time.

11. A method according to claim 9, wherein, on the shared board, a color or shape of information written by the conference apparatus is different from a color or shape of information written by the counterpart apparatus.

12. A method according to claim 9, wherein the shared information includes a character and a figure.

13. A method according to claim 9, wherein the shared information includes at least one of drawing position information, size information, thickness information, and drawing figure size information of the shared information on the shared board.

14. A method according to claim 9, wherein the indication indicates a time.

15. A method according to claim 9, wherein the indication indicates a keyword.

16. A method according to claim 9, wherein the shared information is stored for each input event.

17. A conference apparatus adapted to perform a conference with a remote counterpart apparatus, said conference apparatus comprising:

a shared board presenting a same image frame to said conference apparatus and to the counterpart apparatus, wherein said shared board is adapted to have shared information written therein by both said conference apparatus and by the counterpart apparatus;

a shared information memory for storing drawing information as said drawing information is input in said shared board, without storing, simultaneously with the drawing information as it is input, previously-stored drawing information;

instruction means for instructing a timing, associated with that information, from among the stored information of the conference, to reproduce that information associated with that timing, from among the stored information of the conference; and reproduction means for reproducing, at a faster-than-real-time rate, the shared information while displaying it at said faster-than-real-time rate, to reach a timing, associated with that information, from among the stored information of the conference, instructed by said instruction means, and reproducing the shared information in synchronism with the image information stored in the image memory, in real time.

18. A method of controlling a conference apparatus to perform a conference with a remote counterpart apparatus, said method comprising the steps of:

presenting a same image frame to the conference apparatus and to the counterpart apparatus on a shared board, wherein the shared board is adapted to have shared information written therein by both the conference apparatus and by the counterpart apparatus;

storing drawing information as the drawing information is input in the shared board, without storing, simultaneously with the drawing information as it is input, previously-stored drawing information;

instructing a timing, associated with that information, from among the stored information of the conference, to reproduce that information associated with that timing, from among the stored information of the conference; and reproducing, at a faster-than-real-time rate, the shared information while displaying it at said faster-than-real-time rate, to reach a timing, associated with that information, from among the stored information of the conference, instructed in said instructing step, and reproducing the shared information in synchronism with the image information stored in the image memory, in real time.

* * * * *

UNITED STATES PATENT AND TRADEMARK OFFICE
CERTIFICATE OF CORRECTION

PATENT NO. : 6,304,283 B1
DATED : October 16, 2001
INVENTOR(S) : Eiichiro Kitagawa It is certified that error appears in the above-identified patent and that said Letters Patent is hereby corrected as shown below:

<u>Title page,</u>
Item [56] References Cited,
U. S. PATENT DOCUMENTS,
"Litahara et al." should read -- Kitahara et al. --.

<u>Drawings,</u>
Sheet 7,
Figure 8, "DETERMINATTION" should read -- DETERMINATION --.

<u>Column 6,</u>
Line 16, "as" (second occurrence) should be deleted.

Signed and Sealed this

Twelfth Day of March, 2002

Attest:

Attesting Officer

JAMES E. ROGAN
*Director of the United States Patent and Trademark Office*